Nov. 26, 1963 A. C. LONGTON 3,112,370

PULSE CODE MODULATION ALARM SYSTEM

Filed Feb. 19, 1962 3 Sheets-Sheet 1

INVENTOR
A. C. LONGTON
BY R. B. Andis
ATTORNEY

INVENTOR
A. C. LONGTON
BY R. B. Andis
ATTORNEY

FIG. 3

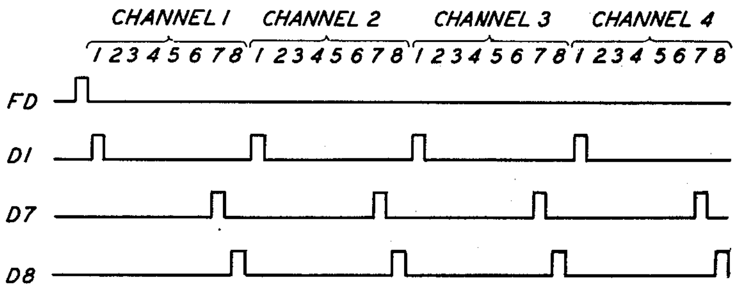

FIG. 4

| | NORMAL | | OUTGOING ALARM | |
|---|---|---|---|---|
| | D7 | D8 | D7 | D8 |
| CHANNEL 1 | 0 | 1 | 0 | 0 |
| CHANNEL 2 | 1 ✳ | 0 | 0 | 0 |
| CHANNEL 3 | 1 ✳ | 0 | 0 | 0 |
| CHANNEL 4 | 0 | 1 | 0 | 0 |
| ⋮ | ⋮ | ⋮ | ⋮ | ⋮ |
| CHANNEL 24 | 0 | 1 | 0 | 0 |

✳ RANDOMLY PRESENT

FIG. 5

| RED | WHITE | YELLOW | GREEN | OFFICE ALARM | CONDITION |
|---|---|---|---|---|---|
| | | | | | NORMAL |
| X | | | | X | INCOMING ALARM |
| X | X | | | | ALARM CUT-OFF |
| | X | | X | | LOOP TEST-RECEIVER OK |
| X | X | | X | | LOOP TEST-RECEIVER NG |
| | | X | | X | OUTGOING ALARM |
| | X | X | | | ALARM CUT-OFF |
| | X | | X | | LOOP TEST-TRANSMITTER OK |
| X | X | | X | | LOOP TEST-TRANSMITTER NG |

INVENTOR
A. C. LONGTON
BY R. B. Ardis
ATTORNEY

United States Patent Office 3,112,370

Patented Nov. 26, 1963

3,112,370

PULSE CODE MODULATION ALARM SYSTEM

Albert C. Longton, North Andover, Mass., assignor to Bell Telephone Laboratories, Incorporated, New York, N.Y., a corporation of New York Filed Feb. 19, 1962, Ser. No. 174,119
8 Claims. (Cl. 179—15)

This invention relates generally to pulse-type communication systems and more particularly, although in its broader aspects not exclusively, to two-way multichannel pulse code modulation telephone systems.

In a typical multichannel pulse code modulation (henceforth referred to simply as PCM) communication system, the contents of each message channel are sampled repetitively at the transmitter at one end of the system and the samples are converted into successive outgoing pulse code groups of binary "1" and binary "0" having a predetermined number of message digit spaces each. The pulse code groups from different channels are interleaved in time to form "frames," each made up of a code group from each message channel in succession. These frames of code groups are transmitted to the receiver at the opposite end of the PCM system, where they are employed to reconstruct the contents of the original message channels.

In a time division multiplex message transmission system of this kind, it is essential that synchronism be maintained between the transmitting and receiving circuitry. To describe the synchronizing process, which requires that the apparatus at opposite ends of the system be kept in step not only with respect to code groups and digit spaces within the code groups but also with respect to frames of code groups, the term "framing" has been borrowed from the television art. When transmitter and receiver are properly synchronized, they are described as being in-frame. When they are not, they are referred to as being out-of-frame.

Although a number of arrangements are known in the art for detecting a momentary out-of-frame condition and acting to restore proper synchronism, it sometimes happens that the trouble is not of the sort that can be eliminated by a simple reframing operation. Then, it is important that an alarm be given and that steps be taken promptly to locate the source of the trouble and restore the system to proper operation. In a two-way PCM system, it is important that both ends of the system be notified, both to facilitate prompt elimination of the trouble condition and to permit ready rerouting of traffic over alternate systems.

One object of the present invention is to notify both terminals of a two-way PCM system when an out-of-frame condition occurs without providing a separate communication channel for that purpose.

Another object is to accomplish such notification with a minimum of system complexity and a maximum of reliability.

Still another object of the invention is to avoid any possible ambiguity in notifying both terminals of a two-way PCM system of an out-of-frame condition.

A further object is to permit the source of the trouble in an out-of-frame two-way PCM system to be identified with a minimum of effort.

In a two-way multichannel PCM telephone system, in order for the PCM equipment to be fully compatible with standard telephone equipment, it is usually necessary to transmit at least channel-idle and channel-busy signaling information over the line along with the pulse code groups associated with each channel. One way of accomplishing this end has, in the past, been to add a further digit space to each code group exclusive of the normal message digit spaces and to transmit either channel-idle or channel-busy information, as appropriate, in digital form in the added digit space. Such an arrangement has the important advantage of being compatible with PCM transmission in every way without detracting from the message-carrying capacity of any individual channel.

The present invention makes use of such a PCM signaling arrangement as a foundation in providing immediate notification to both ends of a two-way system of an out-of-frame condition with a minimum of circuit complexity and a maximum of reliability. The invention avoids any possibility of ambiguity with respect to other signaling conditions and, in addition, permits the source of the trouble to be identified with a minimum of effort.

In accordance with a principal feature of the invention, as soon as one terminal of a two-way PCM system detects an out-of-frame condition between its receiver and the incoming pulse code groups it not only actuates a local alarm but also imposes a distinct signaling condition upon the outgoing pulse code groups being transmitted to the other terminal. In accordance with this feature of the invention, busy information in digital form is transmitted in the added non-message digit space of each successive outgoing pulse code group and no signal is transmitted in each successive outgoing pulse code group in the least significant, in the mathematical sense, of the message digit spaces. In the case of binary "0" representing both a digital busy signal and no signal in the message digit spaces of a code group, it is binary "0" that is transmitted, in accordance with the invention, in the additional and least significant message digit spaces of each successive out-going pulse code group to designate an alarm condition. Since binary "1" is present at least randomly whenever a channel is actually busy, the alarm indication transmited over the line to the other terminal is unique and incapable of being confused with a true all-channel-busy indication.

In accordance with another feature of the invention, switching means is provided, in addition, to connect the receiver at either end of the two-way PCM system directly to its own transmitter to receive its own transmitted pulse code groups whenever an alarm occurs. If the out-of-frame condition is between the local receiver and its incoming pulse code groups, immediate determination is thereby made of whether or not the trouble is in the local receiver. If the out-of-frame condition is between the remote receiver and its incoming pulse code groups, the determination is whether or not the trouble is in the local transmitter.

A more complete understanding of the invention and its several objects and features may be obtained by a study of the following detailed description of one specific embodiment. In the drawings:

FIGS. 1 and 2, when placed side-by-side to match connecting leads, illustrate a complete terminal at one end of a two-way PCM system embodying the various features of the invention;

FIG. 3 shows some of the timing waves used in the embodiment of the invention illustrated in FIGS. 1 and 2;

FIG. 4 is a chart showing the contents of several outgoing pulse code groups under both normal and alarm conditions in the illustrated embodiment of the invention; and FIG. 5 is a chart showing the externnal alarm indications afforded by the embodiment of the invention illustrated in FIGS. 1 and 2.

Figure 1:
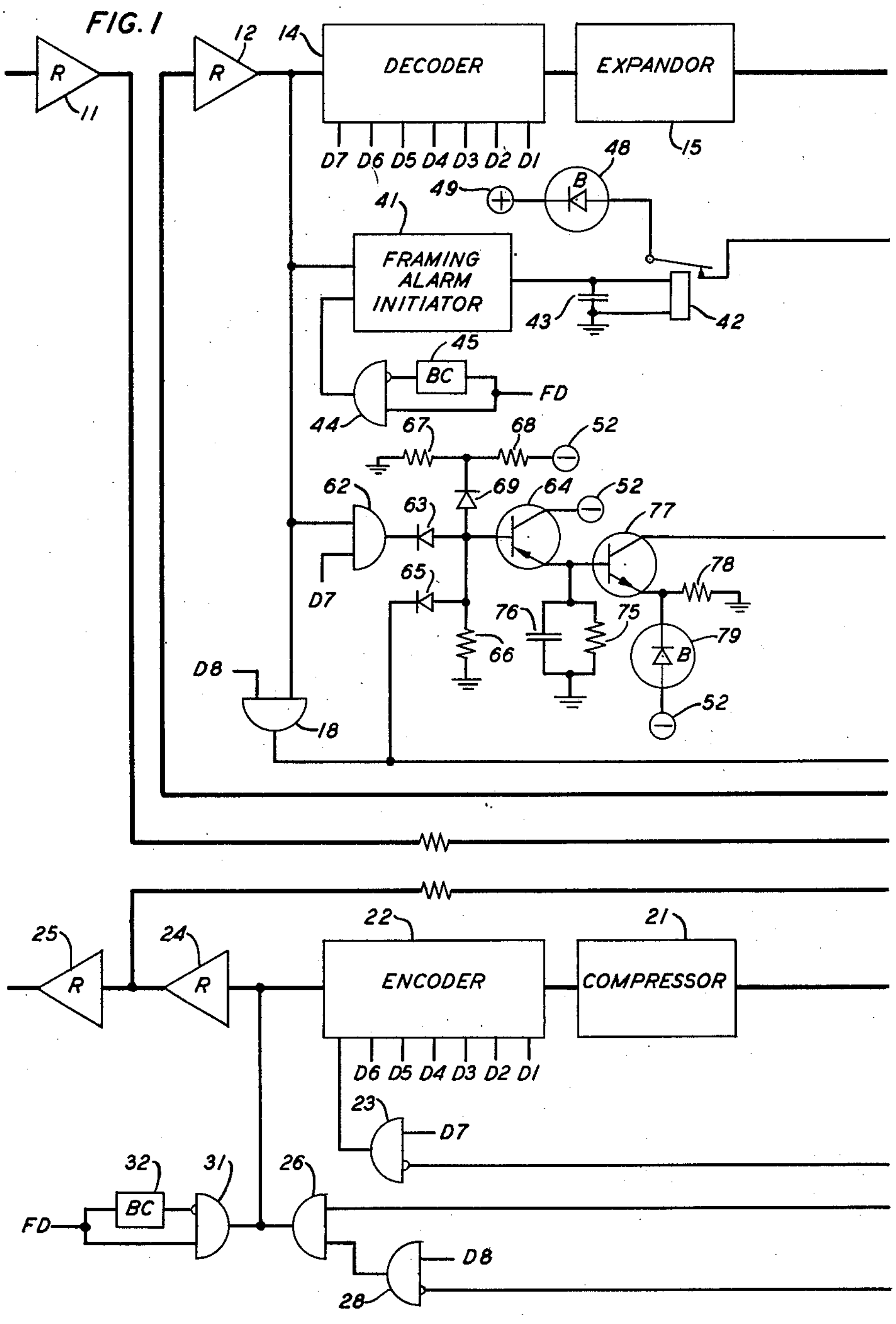
Figure 2:
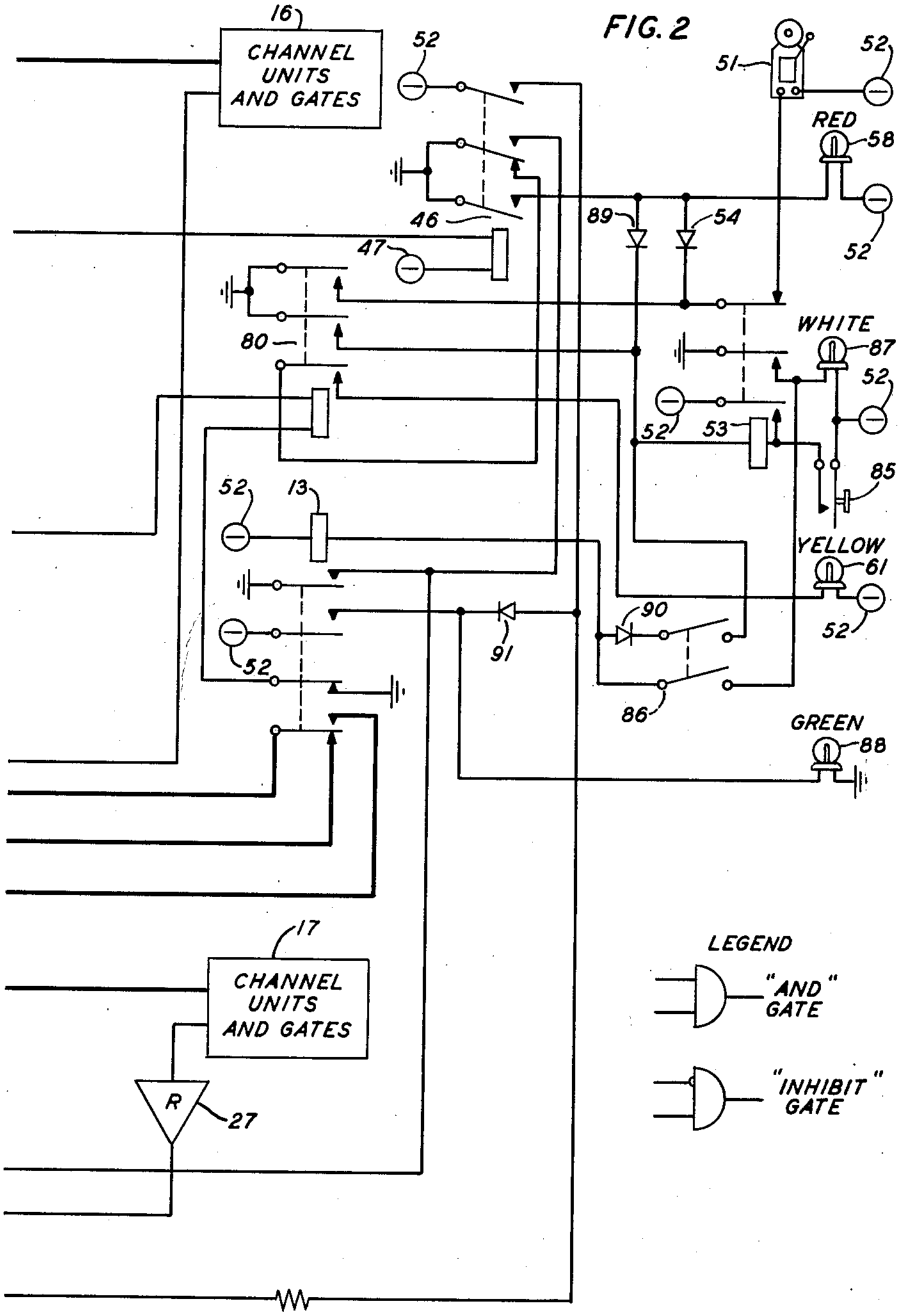

In its basic elements, the two-way multichannel PCM telephone terminal illustrated in FIGS. 1 and 2 is substantially identical with those disclosed in U.S. Patent 3,030,448, which issued April 17, 1962, to D. J. Leonard and R. H. Shennum. It is a little simpler in its signaling circuitry, as a less elaborate form of signaling is shown. No details of multiplexing and demultiplexing gates and other equipment used on the per-channel basis are shown in order to avoid cluttering the disclosure with unnecessary detail.

In the upper left-hand corner of FIG. 1, incoming pulse code groups from the repeatered line, represented by a regenerative pulse amplifier 11, are supplied to the local receiver. They reach a local regenerative pulse amplifier 12 through the break portion (closed when released) of a transfer contact of a relay 13 in the left-center portion of FIG. 2. From amplifier 12, the incoming pulse code groups go to a decoder 14 which reconverts them to the originally transmitted message amplitude samples. In the illustrated system, each pulse code group includes seven consecutive message digits of descending mathematical significance. Decoder 14 may, for example, take the form of the one disclosed in United States Patent 2,991,422, which issued July 4, 1961, to R. E. Yaeger, and is controlled by timing pulses which are applied to the control leads labeled D1 through D7. These timing pulses are generated in conventional fashion and their nature is illustrated by the second and third lines of FIG. 3. As shown, they occur in their designated digit spaces in time and repeat cyclically during the assigned life of every code group.

From decoder 14, the decoded message amplitude samples pass through an expandor 15 to the channel circuit 16. Expandor 15 provides instantaneous amplitude range expansion to complement compression at the opposite end of the system and provide improved signal-to-noise performance and is conventional. The channel circuits, shown in part as box 16 and in part as box 17 in the transmitter portion of the terminal, include timing gates for each channel, low-pass filters, hybrid circuits for combining and separating transmitting and receiving paths, and the necessary signaling circuitry for transmitting and receiving channel-idle and channel-busy information. Since these circuits are disclosed in more detail in the above-identified patent of D. J. Leonard and R. H. Shennum, they are represented here merely by boxes 16 and 17 for the sake of simplicity.

The output side of amplifier 12 in the upper left-hand portion of FIG. 1 is also connected to one input terminal of an AND gate 18 which is supplied with timing pulses on its remaining input terminal during an additional or non-message digit space. This digit space may, in general, either follow or precede the message digit spaces but is labeled D8 here for convenience. As illustrated in the fourth or bottom line of FIG. 3, D8 pulses occur once each code group during this additional digit space. AND gate 18 is conventional and gives an output only when its input terminals are energized simultaneously. As disclosed in the above-identified patent of Leonard and Shennum, the output side of AND gate 18 is connected to the channel circuits 16.

The transmitter portion of the terminal shown in FIGS. 1 and 2 begins at box 17 in the lower left-hand portion of FIG. 2. This part of the channel circuitry supplies samples of the message amplitudes in successive channels to a compressor 21 near the bottom of FIG. 1. Compressor 21 is conventional and introduces instantaneous amplitude compression to provide improved signal-to-noise performance. Following compressor 21 is a PCM encoder 22 which may, for example, take the form of the one illustrated in U.S. Patent 3,051,901, which issued August 28, 1962, to R. E. Yaeger. Encoder 22 is timed by pulses occurring during digit spaces D1 through D7, as is decoder 14, but instead of being supplied directly, D7 pulses are supplied through an INHIBIT gate 23. INHIBIT gate 23 is conventional and passes D7 pulses except when its INHIBIT terminal, represented by the small semicircle, is energized. From encoder 22, outgoing pulse code groups pass through a regenerative pulse amplifier 24 to the repeatered line, represented by a regenerative pulse amplifier 25.

Channel-idle or channel-busy information, as appropriate, is added to the outgoing pulse code groups at the output of encoder 22. An AND gate 26 has its output connected to that point and has one of its input leads driven through a regenerative pulse amplifier 27 from channel circuits 17 in the manner shown in the above-identified patent of Leonard and Shennum. The other input lead of AND gate 26 is driven by D8 timing pulses through an INHIBIT gate 28.

A framing pattern is added to the outgoing pulse train by interrupting the timing pulse sequence once each frame and inserting an additional framing digit space in the manner disclosed in United States Patent 2,984,706, which issued May 16, 1961, to H. M. Jamison and R. L. Wilson. The timing pulse so provided is labeled FD (for framing digit) and is illustrated in the first line of FIG. 3. An alternating pattern of binary "1" and binary "0" is transmitted in this framing digit space by an INHIBIT gate 31 and a binary counter 32. Framing digit pulses are supplied through the transmission path of INHIBIT gate 31 to the output side of encoder 22. At the same time, they are supplied to binary counter 32 which, in turn, controls the INHIBIT terminal of INHIBIT gate 31. An alternating pattern of binary "1" and binary "0" results and is transmitted with the outgoing pulse code groups in the additional framing digit space.

Normal reframing after momentary out-of-frame conditions may be accomplished in the manner disclosed in United States Patent 2,949,503, which issued August 16, 1960, to F. T. Andrews, Jr. and H. Mann. The circuitry for accomplishing such reframing is associated with the receiver in the PCM terminal. It is not illustrated here for the reason that it plays no direct role with respect to the features of the present invention.

The transmitting and receiving portions of the PCM terminal that have thus far been described form, in an important sense, the environment for the present invention. Together with a like terminal at the opposite end of the system, such a terminal forms a complete and fully operative two-way multichannel PCM telephone system. The problems remain, however, of promptly notifying both terminals of a persisting out-of-frame condition in either direction of transmission and locating the probable source of the trouble with a minimum of effort.

A so-called incoming alarm (i.e., an out-of-frame condition existing between the local receiver and the incoming pulse code groups) is detected by the framing alarm initiator 41 connected to the output side of amplifier 12 in the upper portion of FIG. 1. Framing alarm initiator 41 is shown here simply as a box, as it is disclosed more fully in copending application Serial No. 153,925, which was filed November 21, 1961, by L. J. Sisti. Alarm initiator 41 compares the received framing pattern with a locally generated framing pattern and supplies an output current which holds a relay 42 operated as long as the two coincide. A capacitor 43 is connected across the operating coil of relay 42 to avoid premature release of relay 42 in the event of a momentary out-of-frame condition which is quickly corrected. The locally generated framing pattern is supplied by the framing timing digit FD in conjunction with an INHIBIT gate 44 and a binary counter 45. The framing digit FD is supplied directly to alarm initiator 41 through the transmission terminal of INHIBIT gate 44 and controls the INHIBIT terminal by way of binary counter 45.

Relay 42 has a make contact (closed when operated) which controls a normally operated relay 46 near the top of FIG. 2. One end of the operating coil of relay 46 is connected to a negative voltage source 47, while the other is connected through the make contact of relay 42 and an avalanche breakdown diode 48 to a positive voltage source 49. Diode 48 is poled to receive a reverse bias in excess of its breakdown voltage from the combination of sources 47 and 49. It affords protection against the failure of either source in that its breakdown voltage is greater than the voltage supplied by either source alone. Should either source fail, diode 48 will immediately open up, releasing relay 46 and generating an alarm just as if an out-of-frame condition had occurred.

A so-called office alarm, represented by a bell 51, is controlled by relay 46. One terminal of bell 51 is connected to a negative voltage source 52. The other is connected through a break contact (closed when released) of a normally released relay 53, a diode 54, and a break contact (open when operated) of relay 46 to ground. Diode 54 provides isolation from other associated circuitry and is poled for easy current flow toward bell 51. Although voltage source 52 appears in a number of places in FIG. 2, it is in reality one source and is shown separately merely to avoid cluttering the drawing with unnecessary cross-connections.

Another alarm indicator, specific to an incoming alarm, is RED lamp 58, connected between negative voltage source 52 and a break contact (open when operated) of relay 46. Both RED alarm 58 and office alarm 51 operate whenever relay 46 is released. Although normally operated relay 46 may be released by a failure of either voltage source 47 or voltage source 49, its primary cause for release is an out-of-frame condition between the local receiver and the incoming pulse code groups detected by framing alarm initiator 41.

A principal feature of the invention operates in response to an incoming (RED) alarm to transmit immediate notification of the alarm condition to the PCM receiver at the opposite end of the system. As has already been pointed out, the invention takes advantage of elements already in the system to do this with a maximum of reliability and circuit simplicity and in an unmistakable manner. In accordance with this feature of the invention, INHIBIT gates 23 and 28 near the bottom of FIG. 1 are used to inhibit the transmission of binary "1" (thereby forcing transmission of binary "0") in the D7 and D8 digit spaces of each outgoing pulse code group. Binary "0" in the additional digit space D8 of each code group is equivalent to a busy indication in each channel. Binary "0" in the least significant message digit space D7, however, precludes such an interpretation, since binary "1" is present at least randomly in the least significant message digit space when any channel is actually busy.

To force transmission of binary "0" during the least significant message digit space D7 during incoming (RED) alarm conditions, the INHIBIT terminal of INHIBIT gate 23 is connected to ground through a break contact (open when operated) of relay 46. To force transmission of binary "0" during the additional digit space D8 during such conditions, the INHIBIT terminal of INHIBIT gate 28 is connected to negative voltage source 52 through another break contact (open when operated) of relay 46. Gate 23 inhibits D7 when its INHIBIT terminal is negative.

At the opposite end of the PCM system, an incoming alarm there actuates similar circuitry and transmits binary "0" in the additional and least significant message digit spaces in each successive code group towards the receiver in FIGS. 1 and 2. Since such an out-of-frame condition exists between the pulse code groups transmitted from the illustrated terminal and the receiver at the remote terminal, it is an outgoing alarm with respect to the illustrated terminal. The terminal illustrated in FIGS. 1 and 2 includes circuitry which responds to the received alarm indication and causes a YELLOW lamp 61 near the right-hand side of FIG. 2 to light.

The outgoing (YELLOW) alarm detector in the illustrated embodiment of the invention makes use of signaling AND gate 18 and adds another AND gate 62. Both AND gates 18 and 62 have input leads connected to the output side of amplifier 12 near the upper left-hand corner of FIG. 1. The remaining input lead of AND gate 18 is driven by timing pulses during digit time D8, while that of AND gate 62 is driven by timing pulses during digit time D7.

Each time binary "1" appears during digit space D7, it is passed as a negative-going pulse through an isolating diode 63 to the base electrode of a p-n-p transistor 64. In a similar manner, each time binary "1" appears during digit space D8, it is passed as a negative-going pulse through another isolating diode 65 to the base of transistor 64. Transistor 64 is an emitter follower and receives a normal forward emitter-base bias from current flowing through a circuit which includes a resistor 66 connected from its base electrode to ground, a pair of potential dividing resistors 67 and 68 connected from negative voltage source 52 to ground, and a diode 69 connected from the base of transistor 64 to the junction between divider resistors 67 and 68. Like diodes 63 and 65, diode 69 is poled for easy current flow away from transistor 64.

The collector electrode of emitter follower transistor 64 is connected directly to negative voltage source 52, while the emitter is returned to ground through a discharge resistor 75 and a timing capacitor 76. The emitter of transistor 64 is also connected directly to the base electrode of a normally non-conducting n-p-n transistor 77, the emitter of which is grounded through a resistor 78 and returned to negative voltage source 52 through a reverse biased avalanche breakdown diode 79. The collector electrode of transistor 77 is connected through the operating coil of a normally released relay 80, appearing near the upper left-hand corner of FIG. 2, to ground through a break contact (closed when released) of relay 13.

Negative-going pulses that appear at the base electrode of emitter follower transistor 64 are transmitted directly to the base electrode of transistor 77. Transistor 64 provides a low impedance path for charging timing capacitor 76 negatively during such intervals. As long as binary "1" occurs during either the D7 or D8 digit spaces, capacitor 76 retains a negative charge sufficient to back bias the emitter-base junction of transistor 77 and hold transistor 77 in its non-conducting condition. In the absence of binary "1" during either digit space, capacitor 76 discharges toward ground through resistor 75. The discharge time constant is such that the absence of binary "1" in the D7 and D8 digit spaces for at least several frames of code groups is necessary before transistor 77 switches into a conducting condition and operates relay 80. The appearance of binary "1" during either digit space is sufficient to restore the negative bias at the base of transistor 77.

In the manner just described, transistors 64 and 77 and their associated circuitry provide a detector which is sensitive to the appearance of binary "0" in the additional and least significant message digit spaces of each successive code group. When such a pattern appears, relay 80 operates. Office alarm 51 is connected through a break contact (closed when released) of relay 53 and a make contact (closed when operated) of relay 80 to ground. Office alarm 51 thus sounds in response to either an incoming or an outgoing alarm. YELLOW alarm lamp 61, however, is individual to an outgoing alarm because it is connected from negative voltage source 52 to ground through a make contact (open when released) of relay 80 and a make contact (closed when operated) of relay 46.

The difference between normal in-frame indications and an outgoing alarm indication received by the terminal equipment shown in FIGS. 1 and 2 is illustrated by the example given in FIG. 4. The additional digit space D8 in this example contains binary "1" in the code groups of channels 1, 4, and 24. These are channel-idle indications and, as shown, binary "0" is normally found in the least significant message digit space D7 on these channels. The additional digit space D8 contains binary "0" in the code groups of channels 2 and 3. These are channel-busy indications and, as shown, binary "1" is present at least randomly in the associated least significant message digit space D7. A received outgoing alarm indication is quite different in that binary "0" is present in both D7 and D8 digit spaces of all channels.

Another important feature of the invention permits the source of a trouble condition to be identified with a minimum of effort immediately upon receipt of either an incoming (RED) alarm or an outgoing (YELLOW) alarm. In accordance with this feature of the invention, the terminal is effectively looped back upon itself so that the receiver receives the pulse code groups transmitted by its own transmitter. The alarm circuitry already described thus permits a determination of whether or not the trouble is in the receiver in the case of an incoming (RED) alarm, or of whether or not the trouble is in the transmitter in the case of an outgoing (YELLOW) alarm. In accordance with a subsidiary feature of the invention, this test can be performed only after an alarm has been received, thereby preventing unnecessary interference with normal in-frame system operation.

The principal additional apparatus required for performing the loop-test function includes an alarm cut-off key 85, a double-pole single-throw loop-test switch 86, a WHITE alarm cut-off lamp 87, a GREEN loop-test lamp 88, and three isolating diodes 89, 90, and 91. WHITE lamp 87 is connected from negative voltage source 52 to ground through a make contact (closed when operated) of relay 53. GREEN lamp 88 is connected from ground to negative voltage source 52 through a make contact (open when released) of relay 13. Alarm cut-off key 85 provides a momentary path from negative voltage source 52 through the operating coil of relay 53 to ground, either by way of isolating diode 89 and a break contact (closed when released) of relay 46 or by way of a make contact (closed when operated) of relay 80. Once relay 53 operates, it is locked by a new connection to negative voltage source 52 through one of its own make contacts (closed when operated). Loop-test switch 86 provides, when closed, a connection from negative voltage source 52 through the operating coil of relay 13 and a make contact (closed when operated) of relay 53 to ground, and a connection from ground through the same make contact of relay 53, isolating diode 90, the operating coil of relay 53, and another make contact of relay 53 to negative voltage source 52. Isolating diode 91 provides a path from the INHIBIT terminal of INHIBIT gate 28 to negative voltage source 52 through a make contact (closed when operated) of relay 13. The INHIBIT terminal of INHIBIT gate 23 is connected to ground through a make contact (closed when operated) of relay 13. Finally, the make portion (closed when operated) of the relay 13 transfer contact provides a connection to the input side of amplifier 12 in the upper left-hand corner of FIG. 1 from the output side of amplifier 24 in the lower left-hand corner of the same figure.

Operation of the various alarm indicators provided by the embodiment of the invention shown in FIGS. 1 and 2 is illustrated in chart form in FIG. 5. As shown, there is no alarm indication for normal in-frame operation of the system in both directions of transmission. An out-of-frame condition detected between the receiver and the incoming pulse code groups results in an incoming (RED) alarm. As shown in FIG. 5, such an alarm causes RED lamp 58 to light and office alarm 51 to sound. Closure of alarm cut-off key 85 causes relay 53 to operate, lighting WHITE lamp 87 and shutting off office alarm 51. Relay 53 is locked in the operated position by the connection to negative voltage source 52 through one of its own make contacts. Both RED lamp 58 and WHITE lamp 87 remain lit, indicating that an incoming (RED) alarm is present but that office alarm 51 has been cut off.

After relay 53 has been locked in the operated condition, relay 13 can be operated by loop-test switch 86. Until then, switch 86 is ineffective as it depends upon operation of relay 53 to complete the path required to operate relay 13. When relay 13 operates, GREEN lamp 88 lights and the input side of receiving amplifier 12 is transferred from the incoming line to the output side of transmitting amplifier 24. WHITE lamp 87 remains lit. If the receiver finds itself in-frame with the transmitted pulse code groups, framing alarm initiator 41 ceases to give an alarm indication and RED lamp 58 goes out. The operator can then be reasonably sure that the trouble condition is not in the local receiver. If, on the other hand, the receiver finds itself out-of-frame with respect to the transmitted code groups, RED lamp 58 remains lit. The operator can then be reasonably certain that the trouble condition is in the local receiver.

An out-of-frame condition detected at the opposite end of the line results, as has already been discussed, in an outgoing (YELLOW) alarm. A received pattern of binary "0" in both D7 and D8 digit spaces of each code group causes relay 80 to operate, office alarm 51 to sound, and YELLOW lamp 61 to light. Closure of alarm cut-off key 85 operates relay 53, lighting WHITE lamp 87 and shutting off office alarm 51. Relay 53 is locked in the operated position in the manner already described. Both YELLOW lamp 61 and WHITE lamp 87 remain lit.

After relay 53 has been locked, relay 13 can be operated by loop-test switch 86. As with a RED alarm, the receiver is then connected to receive pulse code groups from its own transmitter and GREEN lamp 88 lights. WHITE lamp 87 remains lit. If the receiver finds itself in-frame with the received code groups, YELLOW lamp 61 goes out, indicating to the operator that the trouble condition is not within the local transmitter. If the receiver finds itself out-of-frame with respect to the transmitter, the alarm condition is detected by framing alarm initiator 41 and RED lamp 58 lights. The operator can then be reasonably sure that the trouble condition is within the local transmitter.

The present invention, it can readily be seen, permits operators at opposite ends of a two-way PCM system to act quickly to locate the source of a persisting out-of-frame condition. In the event that transmitters and receivers at both ends of the system pass the loop-test scrutiny, the operators can be quite sure that the source of the difficulty is to be found in the repeatered line between them.

It is to be understood that the above-described arrangements are illustrative of the application of the principles of the invention. Numerous other arrangements may be devised by those skilled in the art without departing from the spirit and scope of the invention.

What is claimed is:

1. A two-way digital message transmission system which includes at each end a transmitter for converting message information into successive outgoing pulse code groups having a predetermined number of message digit spaces each, signaling means for adding a further digit space to each code group exclusive of said message digit spaces and transmitting either busy or idle information in digital form in said further digit space, a receiver for reconstructing message information from incoming pulse code groups having said predetermined number of message digit spaces each, means for detecting an out-of-frame condition between said receiver and said incoming pulse code groups, and alarm means responsive to a detected out-of-frame condition for transmitting busy information in digital form in each successive outgoing code group in said further digit space and no signal in each successive outgoing code group in the least significant of said message digit spaces.

2. A two-way digital message transmission system which includes at each end a transmitter for converting message information into successive outgoing pulse code groups of binary "1" and binary "0" having a predetermined number of message digit spaces each, signaling means for adding a further digit space to each code group exclusive of said message digit spaces and transmitting either one binary indication as an idle signal or the other binary indication as a busy signal in said further digit space, a receiver for reconstructing message information from incoming pulse code groups of binary "1" and binary "0" having said predetermined number of message digit spaces each, means for detecting an out-of-frame condition between said receiver and said incoming pulse code groups, and alarm means responsive to a detected out-of-frame condition for transmitting the binary indication for a busy signal in each successive outgoing code group in said further digit space and binary "0" in each successive outgoing code group in the least significant of said message digit spaces.

3. A two-way digit message transmission system which includes at each end a transmitter for converting message information into successive outgoing pulse code groups of binary "1" and binary "0" having a predetermined number of message digit spaces each, signaling means for adding a further digit space to each code group exclusive of said message digit spaces and transmitting either binary "1" as an idle signal or binary "0" as a busy signal in said further digit space, a receiver for reconstructing message information from incoming pulse code groups of binary "1" and binary "0" having said predetermined number of message digit spaces each, means for detecting an out-of-frame condition between said receiver and said incoming pulse code groups, and alarm means responsive to a detected out-of-frame condition for transmitting binary "0" in each successive outgoing code group both in said further digit space and in the least significant of said message digit spaces.

4. A two-way digital message transmission system which includes at each end a transmitter for converting message information into successive outgoing pulse code groups having a predetermined number of message digit spaces each, signaling means for adding a further digit space to each code group exclusive of said message digit spaces and transmitting either busy or idle information in digital form in said further digit space, a receiver for reconstructing message information from incoming pulse code groups having said predetermined number of message digit spaces each, means for detecting an out-of-frame condition between said receiver and said incoming pulse code groups, alarm means responsive to a detected out-of-frame condition for transmitting busy information in digital form in each successive outgoing code group in said further digit space and no signal in each successive outgoing code group in the least significant of said message digit spaces, and means at at least one end to connect said receiver directly to said transmitter to receive said transmitted pulse code groups and test both said receiver and said transmitter for framing error.

5. A two-way multichannel digital message transmission system which includes at each end a transmitter for converting message information into successive outgoing pulse code groups having a predetermined number of message digit spaces each, each successive one of said code groups conveying the contents of a different message channel, channel signaling means for adding a further digit space to each code group of each message channel exclusive of said message digit spaces and transmitting either channel-busy or channel-idle information in digital form in said further digit space, a receiver for reconstructing message information from incoming pulse code groups having said predetermined number of message digit spaces each, means for detecting an out-of-frame condition between said receiver and said incoming pulse code groups, and alarm means responsive to a detected out-of-frame condition for transmitting channel-busy information in digital form in each successive outgoing code group in said further digit space and no signal in each successive outgoing code group in the least significant of said message digit spaces, the resulting combination of busy indications and no signal in the least significant message digit space in all channels being unique to such an alarm condition.

6. A two-way multichannel digital message transmission system which includes at each end a transmitter for converting message information into successive outgoing pulse code groups of binary "1" and binary "0" having a predetermined number of message digit spaces each, each successive one of said code groups conveying the contents of a different message channel, channel signaling means for adding a further digit space to each code group of each message channel exclusive of said message digit spaces and transmitting either one binary indication as a channel-idle signal or the other binary indication as a channel-busy signal in digital form in said further digit space, a receiver for reconstructing message information from incoming pulse code groups of binary "1" and binary "0" having said predetermined number of message digit spaces each, means for detecting an out-of-frame condition between said receiver and said incoming pulse code groups, and alarm means responsive to a detected out-of-frame condition for transmitting the binary indication for a channel-busy signal in each successive outgoing code group in said further digit space and binary "0" in each successive outgoing code group in the least significant of said message digit spaces, the resulting combination of busy indications and no signal in the least significant message digit space in all channels being unique to such an alarm condition.

7. A two-way multichannel digital message transmission system which includes at each end a transmitter for converting message information into successive outgoing pulse code groups of binary "1" and binary "0" having a predetermined number of message digit spaces each, each successive one of said code groups conveying the contents of a different message channel, channel signaling means for adding a further digit space to each code group of each message channel exclusive of said message digit spaces and transmitting either binary "1" as a channel-idle signal or binary "0" as a channel-busy signal in digital form in said further digit space, a receiver for reconstructing message information from incoming pulse code groups of binary "1" and binary "0" having said predetermined number of message digit spaces each, means for detecting an out-of-frame condition between said receiver and said incoming pulse code groups, and alarm means responsive to a detected out-of-frame condition for transmitting binary "0" in each successive outgoing code group both in said further digit space and in the least significant of said message digit spaces, the resulting combination of busy indications and no signal in the least significant message digit space in all channels being unique to such an alarm condition.

8. A two-way multichannel digital message transmission system which includes at each end a transmitter for converting message information into successive outgoing pulse code groups having a predetermined number of message digit spaces, each successive one of said code groups conveying the contents of a different message channel, channel signaling means for adding a further digit space to each code group of each message channel exclusive of said message digit spaces and transmitting either channel-busy or channel-idle information in digital form in said further digit space, a receiver for reconstructing message information from incoming pulse code groups having said predetermined number of message digit spaces each, means for detecting an out-of-frame condition between said receiver and said incoming pulse code groups, alarm means responsive to a detected out-of-frame condition for transmitting channel-busy information in digital form in each successive outgoing code group in said further digit space and no signal in each successive outgoing code group in the least significant of said message digit spaces, the resulting combination of busy indications and no signal in the least significant message digit space in all channels being unique to such an alarm condition, and means at at least one end to connect said receiver directly to said transmitter to receive said transmitted pulse code groups and test both said receiver and said transmitter for framing error.

No references cited.